United States Patent [19]

Oshima et al.

[11] 4,429,769
[45] Feb. 7, 1984

[54] FLOATING CALIPER TYPE DISC BRAKE

[75] Inventors: Harumi Oshima; Tukasa Uno, both of Kanagawa, Japan

[73] Assignee: Tokico Ltd., Kanagawa, Japan

[21] Appl. No.: 363,780

[22] Filed: Mar. 31, 1982

[30] Foreign Application Priority Data

Mar. 31, 1981 [JP] Japan ............................. 56-45936

[51] Int. Cl.³ ...................... F16D 65/09; F16D 65/20
[52] U.S. Cl. ............................ 188/73.31; 188/73.38; 188/205 A
[58] Field of Search ............... 188/73.31, 73.34, 73.35, 188/73.36, 73.37, 73.38, 72.5, 205 A, 250 E, 72.3

[56] References Cited

U.S. PATENT DOCUMENTS 4,171,037 10/1979 Souma et al. .................... 188/73.38
4,245,723 1/1981 Moriya ............................. 188/72.3

FOREIGN PATENT DOCUMENTS 55-175639 8/1983 Japan .
2013290 8/1979 United Kingdom ............. 188/73.38

Primary Examiner—Douglas C. Butler
Assistant Examiner—Robert J. Oberleitner
Attorney, Agent, or Firm—Wenderoth, Lind & Ponack

[57] ABSTRACT

A floating caliper type disc brake comprising a pair of friction pads, a caliper adapted to be mounted on a stationary member to slide thereon in the direction of the axis of a rotatable disc, each of the friction pads having on opposite ends in the direction of the circumference of the disc projections for mounting slidably the friction pads on the stationary member, and a guide plate adapted to be interposed between the stationary member and each of projections of friction pads in mounting the friction pads on the stationary member. Each guide plate has a generally channel shaped retaining portion for engaging slidably with the projection of the friction pad, an upwardly extending hook portion extending from the upper end of the retaining portion and along the side surface of the caliper, and a hook provided on the upper end of the hook portion and adapted to engage with a circumferentially projecting lug provided on the side surface of the caliper, thereby suspending the friction pads on the caliper when the caliper and the friction pads are not mounted on the stationary member.

2 Claims, 4 Drawing Figures

FLOATING CALIPER TYPE DISC BRAKE

BACKGROUND OF THE INVENTION

This invention relates to a floating caliper type disc brake and, particularly to the disc brake of the type wherein a stationary member slidably or floatingly guiding thereon a caliper is integrally formed with such as a knuckle member or the like constituting a non-rotatable part of a vehicle, and the caliper and friction pads constitute an assembly such that the assembly is mounted on the knuckle member by two guide bolts. Such disc brakes enable to reduce the weight of the vehicle and to decrease the number of parts and are usually called as direct-mount disc brakes.

In the direct-mount disc brakes there are problems that the assembling process is troublesome and time consuming thereby increasing assembling costs and decreasing the productivity and that the parts controlling is difficult, since parts such as the caliper, friction pads and pad springs are usually manufactured respectively by respective parts manufactures and are assembles at a vehicle manufacturer.

Japanese Utility Model Disclosure (Kokai-Koho) No. 55-175639 shows a friction pad guiding and supporting device wherein a guiding and supporting member formed of a spring steel plate extends between a caliper and a friction pad such that the relative displacement between the friction pad and the guiding and supporting member in the radially inward and outward directions and in the circumferential directions is prevented and the relative displacement between the caliper and the guiding and supporting member is restricted such that the friction pad can be suspended from the caliper when the caliper and the friction pad are demounted from the stationary member.

SUMMARY OF THE INVENTION

One of the objects of the invention is to provide a guiding and supporting member between the caliper and friction pads so that the friction pads can be suspended from the caliper when the friction pads and the caliper are demounted from the caliper.

Another object of the invention is to provide the guiding and supporting member such that the guiding and supporting member is interposed between the friction pads and the stationary member when the caliper and the friction pads are mounted on the stationary member such that the guiding and supporting member acts to guide the friction pads in applying brakes and to transmit the braking torque between the friction pads and the stationary member.

The floating caliper type disc brake according to the invention comprises a pair of friction pads, a caliper adapted to be mounted on a stationary member to slide thereon in the direction of the axis of a rotatable disc, each of the friction pads having on opposite ends in the direction of the circumference of the disc projections for mounting slidably the friction pads on the stationary member, and a guide plate adapted to be interposed between the stationary member and each of projections of friction pads in mounting the friction pads on the stationary member. The guide plate has a generally channel shaped retaining portion for engaging slidably with the projection of the friction pad, an upwardly extending hook portion extending from the upper end of the retaining portion and along the side surface of the caliper, and a hook provided on the upper end of the hook portion and adapted to engage with a circumferentially projecting lug provided on the side surface of the caliper, thereby suspending the friction pads on the caliper when the caliper and the friction pads are disassembled from the stationary member.

BRIEF DESCRIPTION OF THE DRAWINGS

The invention will now be explained in detail in conjunction with attached drawings illustrating one prepared embodiment of the invention.

In the drawings.

DETAILED DESCRIPTION OF THE PREFERRED EMBODIMENT

Figure 1:
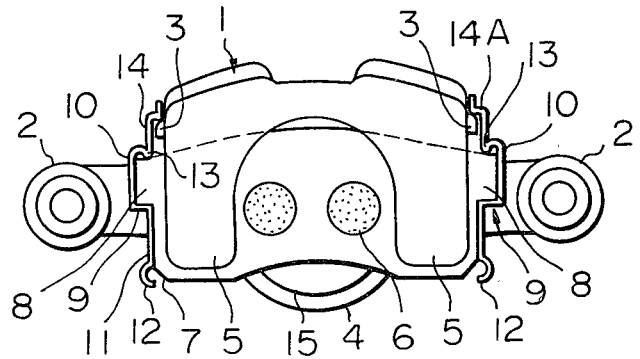
FIG. 1 is a front view of a disc brake according to the invention.
Figure 2:
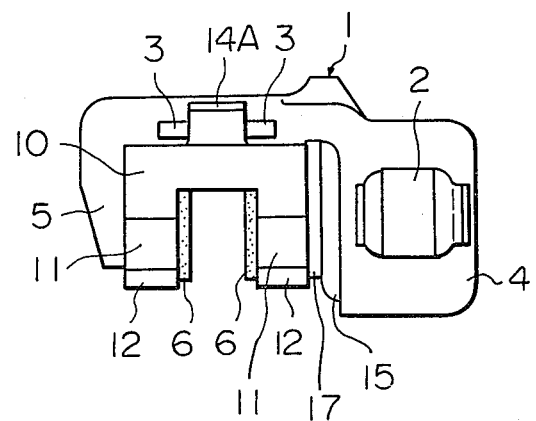
FIG. 2 is a side view.

Referring to FIGS. 1 and 2, the disc brake according to the invention includes a caliper 1, two friction pads 6 and 6, and two guide plates 9 and 9. The caliper 1 has two circumferentially (sidewisely as viewed in FIG. 1) spaced mounting portions 2 and 2 which is adapted to slidably receive therein respective guide pins (not shown) in mounting the caliper 1 on a stationary member 21 (FIG. 4), a limb portion 4 incorporating therein a piston 15 for pressing adjacent friction pad 6, and another limb portion 5 for acting on another (the left side as viewed in FIG. 2) friction pad 6.

The friction pads 6 have backing plates 7 and friction material integrally secured thereto. Each backing plate has on circumferentially opposite ends projections 8 and 8 for mounting slidably the friction pad on correspondingly shaped stepped portions of the stationary member in mounting the friction pad on the stationary member.

Figure 3:
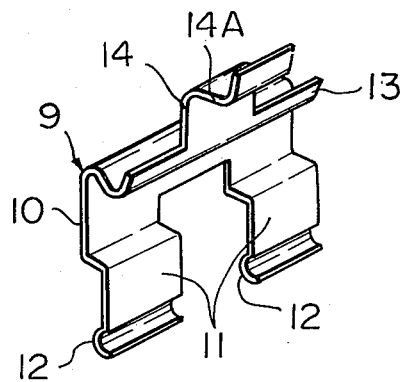
FIG. 3 is a perspective view of a guide plate constituting one of essential parts of the disc brake of FIG. 1.

Each of guide plates 9 has, as shown in FIG. 3, a generally channel shaped retaining portion 10 extending in the direction of the axis of a rotatable disc 16 (FIG. 4) or in the direction vertical to the paper of FIG. 1, for slidably engaging with the projection 8 of the friction pad 6, an upwardly extending hook portion 14 having a hook 14A on the upper end portion thereof, a torque transmitting portion 11 extending from the lower end of the channel shaped portion 10, and an axially extending ridge 12 on the lower end of the torque transmitting portion 11. The guide plate 9 is formed of an anticorrosion material such as stainless steel or the like.

The channel shaped portion 10 further includes on the upper end thereof a resilient portion 13 resiliently extending downwardly and circumferentially inwardly as shown in FIG. 3 so that the channel shaped portion resiliently engages with the upper and lower ends of the projection 8. The resilient engagement between the guide plate and the friction pad is not so large to interfere the sliding movement therebetween in the direction of the axis of the disc in applying brakes. There are provided on circumferentially opposite side surfaces of the caliper 1 lugs 3 and 3 which are adapted to engage with hooks 14A and 14A of the guide plate 9 respectively when the caliper 1, the friction pads 6 and 6 and guide plates 9 are assembled together thereby suspending the friction pads from the caliper.

The guide plate 9 further has on the radially inner end (the lower end as viewed in FIG. 2) of the torque transmitting portion 11 an axially extending ridge portion 12. The ridge portion 12 is adapted to engage with a radially inner edge of torque receiving portion of the stationary member when the caliper, the guide plate and the friction pad are mounted on the stationary member thereby locating the guide plate with respect to the stationary member, preventing radially outward movement of the guide plate and the friction pad with respect to the stationary member and preventing rattling movement of friction pad with respect to the stationary member.

Figure 4:
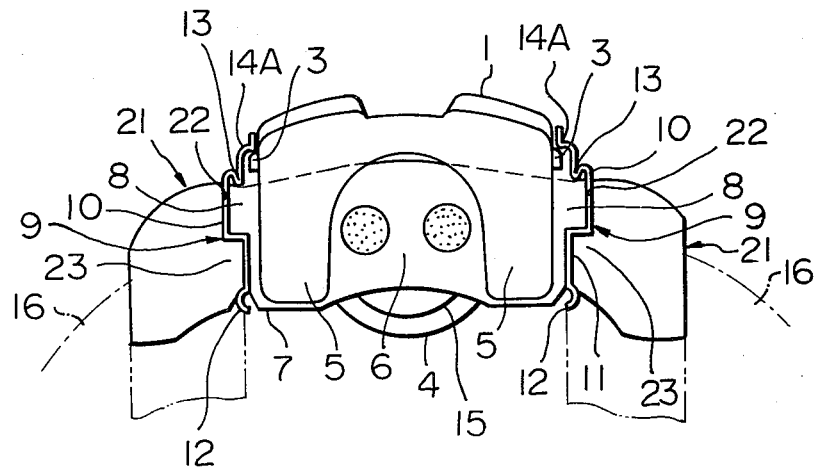
FIG. 4 is a front view of the disc brake of FIG. 1 being mounted on a stationary member.

The caliper 1, the friction pads 6 and the guide plates 9 are assembled together to have the condition as seen in FIGS. 1 and 2 and, thereafter, the assembly is mounted on a stationary member 21 as shown in FIG. 4. The stationary member 21 is integrally formed on such as a knuckle member of a vehicle and includes pad guiding portions 22 and 22 which are spaced in the direction of the circumference of a rotatable disc 16 and straddling respectively the outer circumference of the disc 16. The pad guiding portions 26 have respectively radially outwardly facing shoulders for mounting thereon projections 8 and 8 of the friction pads 6 interposing therebetween channel shaped portions 10 of the guide plates. The guiding portions 22 further have torque receiving portions 23 defining circumferentially opposing torque receiving surfaces for engaging respectively the torque transmitting portions 11 of guide plates 9, and the radially inner edges of the torque receiving surfaces are formed to snugly engage with axially extending ridges 12 of the guide plates 9.

When the assembly consisting of the caliper 1, the friction pads 6 and 6 and guide plates 9 and 9 are mounted on the stationary member 21 as shown in FIG. 4, the hooks 14A of the guide plates 9 preferably separate from the lugs 3 and 3 of the caliper 1. Whereby, the friction pads 6 and 6 are resiliently mounted on the stationary member and the vibrations therebetween can be prevented and rattling noise caused of such vibrations can be suppressed and, further, the caliper simply acts to press the friction pads in the direction of the axis of the disc.

The guide plates can effectively prevent rust or the like which will otherwise be observed between the friction pads and the stationary member.

As described heretofore, according to the invention, guide plates formed of such as stainless steel are provided on circumferentially opposite sides of friction pads which act, when the caliper and friction pads are mounted on the stationary member, to locate the friction pads on guiding surfaces of the stationary member preventing vibrations of friction pads which allowing axial movement of friction pads in applying brakes and, when the caliper and friction pads are not mounted on the stationary member, to hang or suspend friction pads from the caliper thereby constituting an assembly. Therefore, it is possible to simplify the assembly process and to improve the productivity.

What is claimed is:

1. A floating caliper type disc brake comprising a pair of friction pads, a caliper adapted to be mounted on a stationary member to slide thereon in the direction of the axis of a rotatable disc, each of said friction pads having on opposite ends in the direction of the circumference of the disc projections for mounting slidably the friction pads on said stationary member, and a guide plate adapted to be interposed between the stationary member and each of projections of friction pads in mounting the friction pads on the stationary member, said guide plate having a generally channel shaped retaining portion for engaging slidably with the projection of the friction pad, an upwardly extending hook portion extending from the upper end of the retaining portion and along the side surface of the caliper, and a hook provided on the upper end of the hook portion and adapted to engage with a circumferentially projecting lug provided on the side surface of the caliper, thereby suspending the friction pads on the caliper when the caliper and the friction pads are disassembled from the stationary member.

2. A floating caliper type disc brake according to claim 1 wherein said guide plate further having a torque transmitting portion extending downward from the lower end of the retaining portion and along the side surface of the friction pad for transmitting braking torque from the friction pad to the stationary member, and an axially extending ridge portion on the lower end of the torque transmitting portion, said ridge portion being adapted to engage with the stationary member when the caliper, the friction pads and the guide plates are mounted on the stationary member thereby preventing the guide plates from escaping out of the stationary member in the upward direction.

* * * * *

UNITED STATES PATENT AND TRADEMARK OFFICE
CERTIFICATE OF CORRECTION

PATENT NO. : 4,429,769
DATED : February 7, 1984
INVENTOR(S) : Harumi OSHIMA and Tukasa UNO It is certified that error appears in the above—identified patent and that said Letters Patent is hereby corrected as shown below:

In the Abstract, line 7, delete "a";

line 8, change "plate" to --plates--;

line 12, change "the projection" to --projections--;

line 13, change "pad" to --pads--;

line 16, change "on" to --at--.

In the Specification:

Column 1, line 6, after "brake" insert --for a vehicle--;

line 8, delete "such";

line 9, delete "as";

line 10, change "a" to --the--;

line 11, delete "such that the assembly" to --which--;

line 13, delete "to reduce"; after "weight" insert --and number of parts--;

line 14, delete entire line and insert --vehicle to be reduced and are--;

UNITED STATES PATENT AND TRADEMARK OFFICE
CERTIFICATE OF CORRECTION

PATENT NO. : 4,429,769
DATED : February 7, 1984
INVENTOR(S) : Harumi OSHIMA and Tukasa UNO It is certified that error appears in the above—identified patent and that said Letters Patent is hereby corrected as shown below:

Column 1, line 15, delete "as";

line 16, change "the" to --prior--;

line 18, after "consuming", insert --,--;

line 19, change "the productivity" to --productivity,--; change "control-" to --inventorying--;

line 20, delete "ling";

line 21, delete "respec-";

line 22, delete "tively"; delete "assem-";

line 23, change "bles at" to --assembled by--;

line 44, change the second occurrence of "the" to --a--;

line 45, delete "such that the guiding";

line 46, delete "and supporting member"; before "is insert --which--;

line 50, after "applying" insert --the--;

line 60, change "plate" to --plates--;

UNITED STATES PATENT AND TRADEMARK OFFICE
CERTIFICATE OF CORRECTION

PATENT NO. : 4,429,769
DATED : February 7, 1984
INVENTOR(S) : Harumi OSHIMA and Tukasa UNO It is certified that error appears in the above—identified patent and that said Letters Patent is hereby corrected as shown below:

Column 1, line 61, change "projections" to --the projections--;

line 62, after "of" insert --the--;

line 63, change "The" to --Each--;

line 65, change the first occurrence of "the" to --a--;

Column 2, line 9, change "pre-" to --preferred--;

line 10, delete "pared";

line 19, delete "being";

line 25, delete "and 6"; change "plates 9 and 9" to --plates 9--;

line 27, delete "and 2"; change "is" to --are--;

line 31, after "pressing" insert --an--; after "adjacent" insert --one of the--; change "pad" to --pads--;

line 32, change "another" to --the other--;

line 37, delete "and 8"; change "mounting slidably" to --slidably mounting; after "the" insert --corresponding--;

UNITED STATES PATENT AND TRADEMARK OFFICE
CERTIFICATE OF CORRECTION

PATENT NO. : 4,429,769

DATED : February 7, 1984

INVENTOR(S) : Harumi OSHIMA and Tukasa UNO

It is certified that error appears in the above—identified patent and that said Letters Patent is hereby corrected as shown below:

Column 2, line 45, after "with" insert --one of--; change "projection" to --projections--; after "of" insert --each of--;

line 46, change "pad" to --pads--;

line 51, change "The" to --Each--;

line 58, change "projection" to --projections--;

line 59, change "plate" to --plates--; change "pad" to --pads--; after "large" insert --as--;

line 64, delete "and 3";

line 65, after "with" insert --the respective--; delete "and 14A"; change "plate" to --plates--; delete "respec-";

line 65, delete "tively"; delete "and 6";

line 66, after "together" insert --,--;

Column 3, line 1, change "The" to --Each--;

line 7, change "pad" to --pads--; after "member" insert --,--;

line 10, change "pad" to --pads--;

UNITED STATES PATENT AND TRADEMARK OFFICE
CERTIFICATE OF CORRECTION

PATENT NO. : 4,429,769
DATED : February 7, 1984
INVENTOR(S) : Harumi OSHIMA and Tukasa UNO It is certified that error appears in the above—identified patent and that said Letters Patent is hereby corrected as shown below:

Column 3, line 12, change "pad" to --pads--;

line 15, delete "to have the condition"; change "seen" to --shown--;

line 18, after "on" insert --a member--;

line 21, delete "and 22";

line 23, change "straddling respectively" to --straddle--;

line 24, change "26" to --22--; change "respectively" to --respective--;

line 26, delete "and 8";

line 30, delete "respec-";

line 31, delete "tively"; after "of" insert --the respective--;

line 36, delete "and 6"; delete "and 9";

line 39, delete "and 3"; change "Whereby" to --As a result--;

line 40, delete "and 6";

UNITED STATES PATENT AND TRADEMARK OFFICE
CERTIFICATE OF CORRECTION

PATENT NO. : 4,429,769
DATED : February 7, 1984
INVENTOR(S) : Harumi OSHIMA and Tukasa UNO It is certified that error appears in the above—identified patent and that said Letters Patent is hereby corrected as shown below:

Column 3, line 42, change "of" to --by--;

Column 4, line 2, after "of" insert --a material--;

line 4, change "which" to --so as to--;

line 6, after "member" insert --thereby--;

line 7, change "which" to --while--;

line 11, change "thereby constituting" to --which thereby constitute--;

line 12, after "simplify" insert --and improve the productivity of--;

line 13, delete "and to improve the productivity".

In the Claims:

Cancel claim 1. Amend the following claim:

Claim 2 (Amended). A floating caliper type disc brake according to Claim [1] 1 wherein said guide [plate] plates further [having] have [a] torque transmitting [portion] portions extending downward from the respective lower [end] ends of [the] said retaining [portion] portions and along [the] said side

UNITED STATES PATENT AND TRADEMARK OFFICE
CERTIFICATE OF CORRECTION

PATENT NO. : 4,429,769
DATED : February 7, 1984
INVENTOR(S) : Harumi OSHIMA and Tukasa UNO It is certified that error appears in the above—identified patent and that said Letters Patent is hereby corrected as shown below:

[surface] surfaces of [the] said friction [pad] pads for transmitting braking torque from [the] said friction [pad] pads to the stationary member, and [an] axially extending ridge [portion] portions on the lower [end] ends of [the] said torque transmitting portions [portion], said ridge [portion] portions being adapted to engage with the stationary member when [the] said caliper, [the] said friction pads and [the] said guide plates are mounted on the stationary member, thereby preventing [the] said plates from escaping from [out of] the stationary member in the upward direction.

Add the following new claim:

--1. A floating caliper type disc brake, comprising:

A caliper mountable on a stationary member on opposite sides of a rotatable disc in the direction of the rotational axis of the disc, said caliper having side surfaces having lugs projecting therefrom in the circumferential direction of the disc;

UNITED STATES PATENT AND TRADEMARK OFFICE
CERTIFICATE OF CORRECTION

PATENT NO. : 4,429,769
DATED : February 7, 1984
INVENTOR(S) : Harumi OSHIMA and Tukasa UNO It is certified that error appears in the above—identified patent and that said Letters Patent is hereby corrected as shown below:

two friction pads for frictionally engaging opposite sides of the rotatable disc, each of said friction pads having on opposite ends in the direction of the circumference of the disc projections for slidably mounting said friction pads on said stationary member; and two guide plates interposable between said stationary member and respective projections of each of said friction pads when said friction pads are mounted on said stationary member;

said guide plates having generally channel-shaped retaining portions for slidably engaging the respective projections of said friction pads, upwardly extending hook portions extending from the respective upper ends of said retaining portions and along corresponding ones of said side surfaces of said caliper, and hooks provided at the upper ends of said hook portions so as to be engageable with said

UNITED STATES PATENT AND TRADEMARK OFFICE
CERTIFICATE OF CORRECTION

PATENT NO. : 4,429,769

DATED : February 7, 1984

INVENTOR(S) : Harumi OSHIMA and Tukasa UNO

It is certified that error appears in the above-identified patent and that said Letters Patent is hereby corrected as shown below:

lugs, thereby suspending said friction pads on said caliper when said caliper and said friction pads are disassembled from the stationary member.--

Signed and Sealed this

Ninth Day of April 1985

[SEAL]

Attest:

DONALD J. QUIGG

Attesting Officer

Acting Commissioner of Patents and Trademarks